United States Patent
Rossino

(10) Patent No.: US 11,982,265 B2
(45) Date of Patent: May 14, 2024

(54) PISTON FOR RECIPROCATING COMPRESSOR HAVING COMPLEMENTARY SEALING ELEMENTS

(71) Applicant: FAIVELEY TRANSPORT ITALIA S.P.A., Turin (IT)

(72) Inventor: Corrado Rossino, Turin (IT)

(73) Assignee: FAIVELEY TRANSPORT ITALIA S.P.A., Turin (IT)

( * ) Notice: Subject to any disclaimer, the term of this patent is extended or adjusted under 35 U.S.C. 154(b) by 152 days.

(21) Appl. No.: 17/634,887

(22) PCT Filed: Aug. 11, 2020

(86) PCT No.: PCT/IB2020/057533
§ 371 (c)(1),
(2) Date: Feb. 11, 2022

(87) PCT Pub. No.: WO2021/028826
PCT Pub. Date: Feb. 18, 2021

(65) Prior Publication Data
US 2022/0325710 A1   Oct. 13, 2022

(30) Foreign Application Priority Data

Aug. 13, 2019 (IT) .................. 102019000014709

(51) Int. Cl.
*F04B 39/00* (2006.01)
*F04B 53/14* (2006.01)
(Continued)

(52) U.S. Cl.
CPC ........ *F04B 39/0005* (2013.01); *F04B 53/143* (2013.01); *F16J 9/10* (2013.01);
(Continued)

(58) Field of Classification Search
CPC . F16J 9/18; F16J 9/06; F16J 9/10; F16J 9/26; F16J 15/188; F16J 15/24; F16J 15/56; F04B 39/0005; F04B 53/02; F04B 53/143
See application file for complete search history.

(56) References Cited

U.S. PATENT DOCUMENTS

| | | | | |
|---|---|---|---|---|
| 892,978 | A | * | 7/1908 | Carter ...................... F16J 15/26 277/548 |
| 2,392,182 | A | * | 1/1946 | Payne ...................... F16J 15/48 92/185 |

(Continued)

FOREIGN PATENT DOCUMENTS

| | | |
|---|---|---|
| CA | 2847760 A1 | 6/2014 |
| EP | 3246569 A1 | 11/2017 |

OTHER PUBLICATIONS

Intellectual Property India, Examination Report Issued in Application No. 202247007140, dated May 10, 2022, 6 pages.
ISA European Patent Office, International Search Report Issued in Application No. PCT/IB2020/057533, dated Oct. 23, 2020, WIPO, 2 pages.

*Primary Examiner* — Dustin T Nguyen
(74) *Attorney, Agent, or Firm* — McCoy Russell LLP

(57) ABSTRACT

A piston is described for the compression of a pneumatic fluid in a compression chamber of a cylinder comprising:
a cylindrically shaped piston body, adapted to be arranged slidably within said cylinder, and having a side wall and a top wall; along a circumferential perimeter of said side wall of the piston body a seat being defined; and
a sealing assembly accommodated in said seat, and adapted to ensure the fluid-tightness along said circumferential perimeter;
the sealing assembly comprising a plurality of sealing elements, having shapes complementary to one another, and configured so that the wear of a sealing
(Continued)

element along said circumferential perimeter corresponds to a sliding in the radially outer direction of the adjacent sealing element.

19 Claims, 9 Drawing Sheets

(51) Int. Cl.
*F16J 9/10* (2006.01)
*F16J 9/18* (2006.01)
*F16J 9/26* (2006.01)
F04B 53/02 (2006.01)
F16J 9/06 (2006.01)
F16J 15/18 (2006.01)
F16J 15/24 (2006.01)
F16J 15/56 (2006.01)

(52) U.S. Cl.
CPC . *F16J 9/18* (2013.01); *F16J 9/26* (2013.01); F04B 53/02 (2013.01); F16J 9/06 (2013.01); F16J 15/188 (2013.01); F16J 15/24 (2013.01); F16J 15/56 (2013.01)

(56) References Cited

U.S. PATENT DOCUMENTS

| | | | |
|---|---|---|---|
| 2,785,029 A | | 3/1957 | Davis |
| 4,362,304 A | * | 12/1982 | Hunger .................. F16J 15/32 |
| | | | 277/455 |
| 10,975,966 B2 | * | 4/2021 | Prudhomme .............. F16J 9/18 |
| 2017/0082202 A1 | * | 3/2017 | Moore ................... C08L 27/14 |
| 2019/0203842 A1 | | 7/2019 | Bidkar et al. |

* cited by examiner

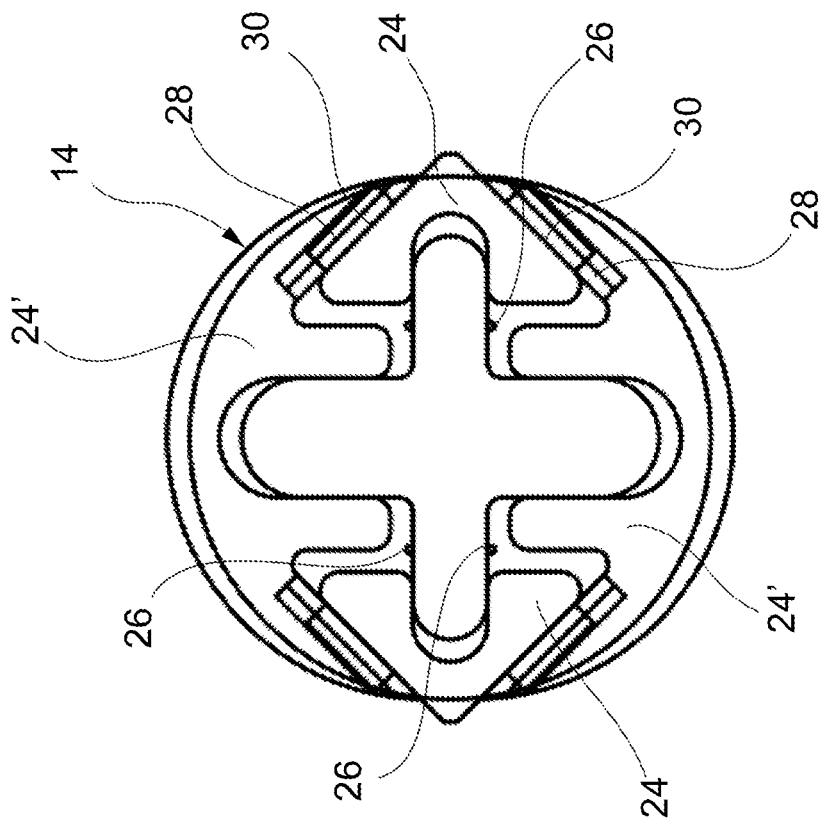
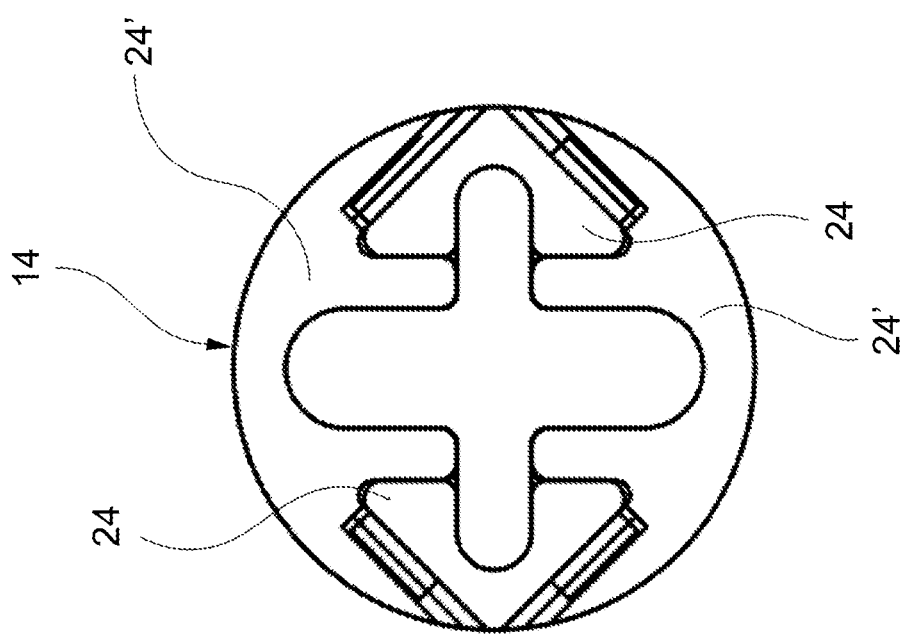
FIG.5b
FIG.5a

PISTON FOR RECIPROCATING COMPRESSOR HAVING COMPLEMENTARY SEALING ELEMENTS

CROSS REFERENCE TO RELATED APPLICATIONS

The present application is a U.S. National Phase of International Application No. PCT/IB2020/057533 entitled "PISTON FOR RECIPROCATING COMPRESSOR HAVING COMPLEMENTARY SEALING ELEMENTS," and filed on Aug. 11, 2020. International Application No. PCT/IB2020/057533 claims priority to Italian Patent Application No. 102019000014709 filed on Aug. 13, 2019. The entire contents of each of the above-listed applications are hereby incorporated by reference for all purposes.

TECHNICAL FIELD

This invention generally relates to the field of reciprocating compressors; in particular, the invention relates to a piston for compressing pneumatic fluid in a cylinder, the piston comprising a plurality of sealing elements of complementary shape.

PRIOR ART

According to the most common known application, the seal in a cylinder-piston mechanism is ensured through the use of a so-called elastic band, that is, a sealing ring arranged in a ring-shaped seat formed along the circumferential perimeter of the piston body. As may be seen in FIG. 1, which is a cross section along a radial plane of a cylinder C-piston P mechanism according to the prior art, said ring-shaped seat S is shaped with a given depth d and with a given height h. The sealing ring R arranged in the seat has slightly smaller dimensions than the ring-shaped seat S, so as to allow that, when the piston P moves in a compression stroke, the sealing ring R is pushed downwards (in FIG. 1) and towards the radially outer direction by the compressed air which enters the ring-shaped seat S. As shown in FIG. 2, which is a cross section along a transverse plane of the cylinder C-piston P mechanism of FIG. 1, the sealing ring R, in order to be easily mounted in the ring-shaped seat S, is not completely closed along the circumference but has a plan-form having a discontinuity D, wherein a radially outer protruding element E1 seals the passage by contact with an opposite radially inner formation E2. Such sealing rings are generally open, and may have different geometries at their ends, whereby the one shown is only one of the conventional geometries. Such protruding element, due to the elastic compression of the sealing ring, is subjected to more intense wear than the rest of the sealing ring; furthermore, due to its necessarily smaller radial thickness with respect to that of the rest of the sealing ring (as clearly shown in FIG. 2), the protruding element wears rapidly. In this way, the known sealing rings lose their sealing capacity as soon as the wear is such as to damage or break at least this protruding element. Typically, a sealing ring according to the prior art may maintain the seal until wear has subtracted about a quarter of the radial thickness of the sealing ring.

Such limitation, understandably, jeopardizes the duration of the operating life cycle of the sealing rings of the prior art, and makes their frequent replacement necessary.

Furthermore, conventional sealing rings, being housed in a ring-shaped seat, may not be oriented angularly, and therefore it is not possible to distribute the wear load in predefined or preferable areas of the ring, more or less sensitive to wear.

SUMMARY OF INVENTION

The object of this invention is to overcome the drawbacks described and other drawbacks of the prior art and to provide a piston wherein the seal is ensured for a longer operating time.

A further object of this invention is to provide a piston which allows an operator to understand easily and in time if the seal is still optimal or if the wear from use makes maintenance necessary.

The aforesaid and other objects and advantages are achieved by a piston for compressing a pneumatic fluid into a cylinder having the features defined in claim 1.

Preferred embodiments of the invention are defined in the dependent claims, the content of which is to be understood as an integral part of this description.

BRIEF DESCRIPTION OF THE DRAWINGS

The functional and structural features of some preferred embodiments of a piston according to the invention will now be described. Reference is made to the accompanying drawings, wherein:

FIGS. 5a and 5b are cross sections along a transverse plane of a piston according to a second embodiment of the invention in a first and a second operating condition, respectively;

FIG. 9 is a cross section along the plane D of FIG. 5a.

DETAILED DESCRIPTION

Figure 1:
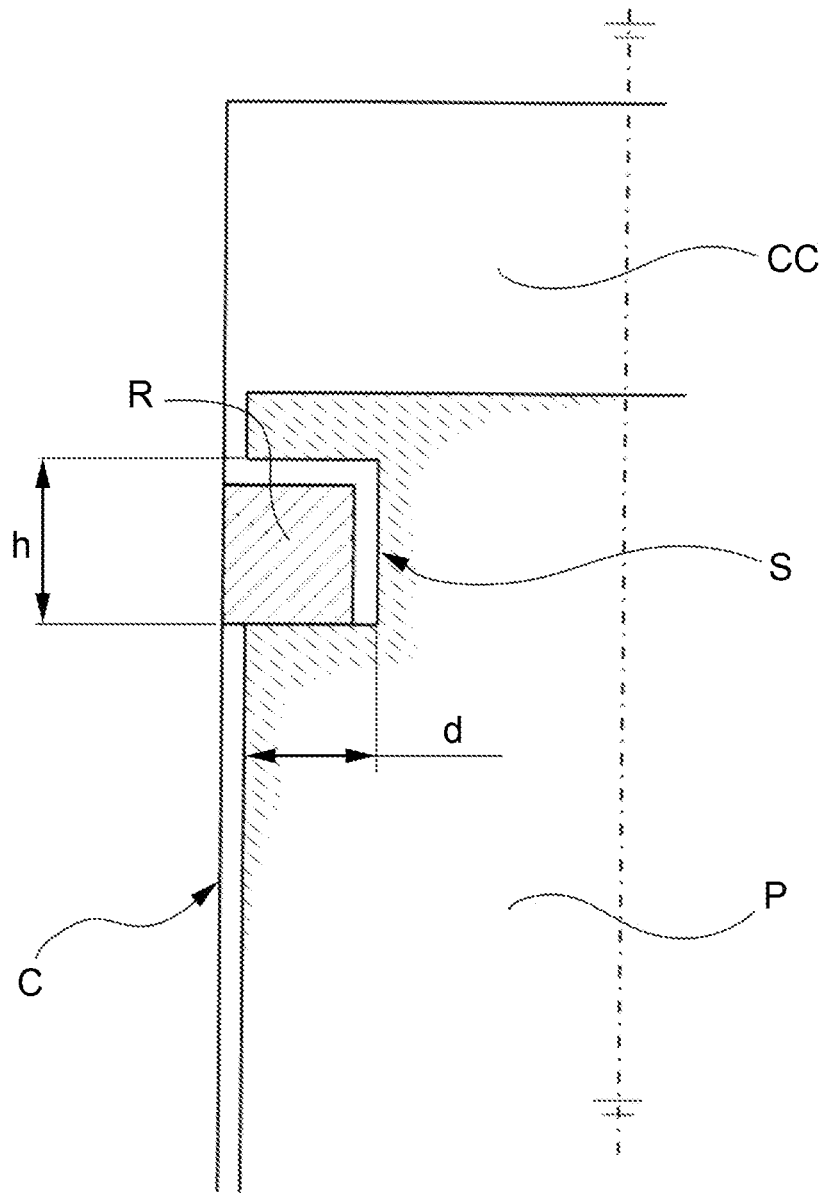
FIG. 1 is a cross section, along a radial plane, of a piston having a sealing ring according to the prior art.
Figure 2:
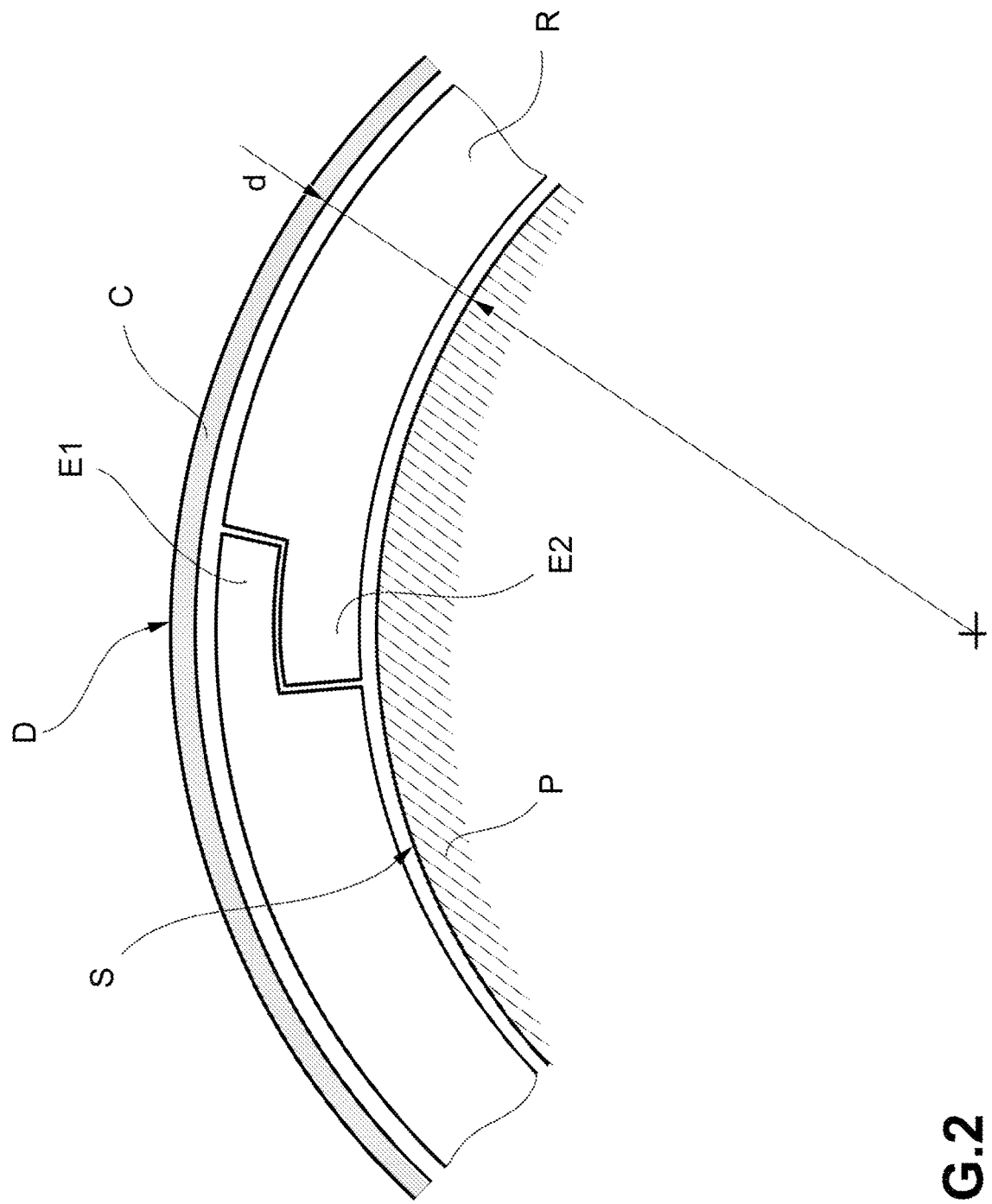
FIG. 2 is a cross section, along a transverse plane, of the piston and the sealing ring of FIG. 1.

Before describing in detail a plurality of purely exemplifying embodiments of the invention, it should be clarified that the invention is not limited in its application to the construction details and to the configuration of the components presented in the following description or illustrated in the drawings. The invention may assume other embodiments and be implemented or constructed in practice in different ways. It should also be understood that the phraseology and terminology have a descriptive purpose and should not be construed as limiting. The use of "include" and "comprise" and their variations are to be understood as encompassing the elements set out below and their equivalents, as well as additional elements and the equivalents thereof.

Throughout the present description and claims, terms and expressions indicating positions and orientations are to refer to their conventional meaning in the scope of a piston-cylinder mechanism. In particular: the term "axial" shall mean a direction extending along or parallel to the longitudinal axis of the piston and/or cylinder; the term "radial" shall mean a direction extending along a radius of the piston and/or cylinder and passing through the longitudinal axis of the same and/or a plane passing through the longitudinal axis of the piston and/or cylinder and a radius of the same; the term "transverse" shall mean a direction extending perpendicular to the longitudinal axis of the piston and/or cylinder and/or a plane perpendicular to the longitudinal axis of the piston and/or cylinder and on which a radius of the same lies.

Figure 3:
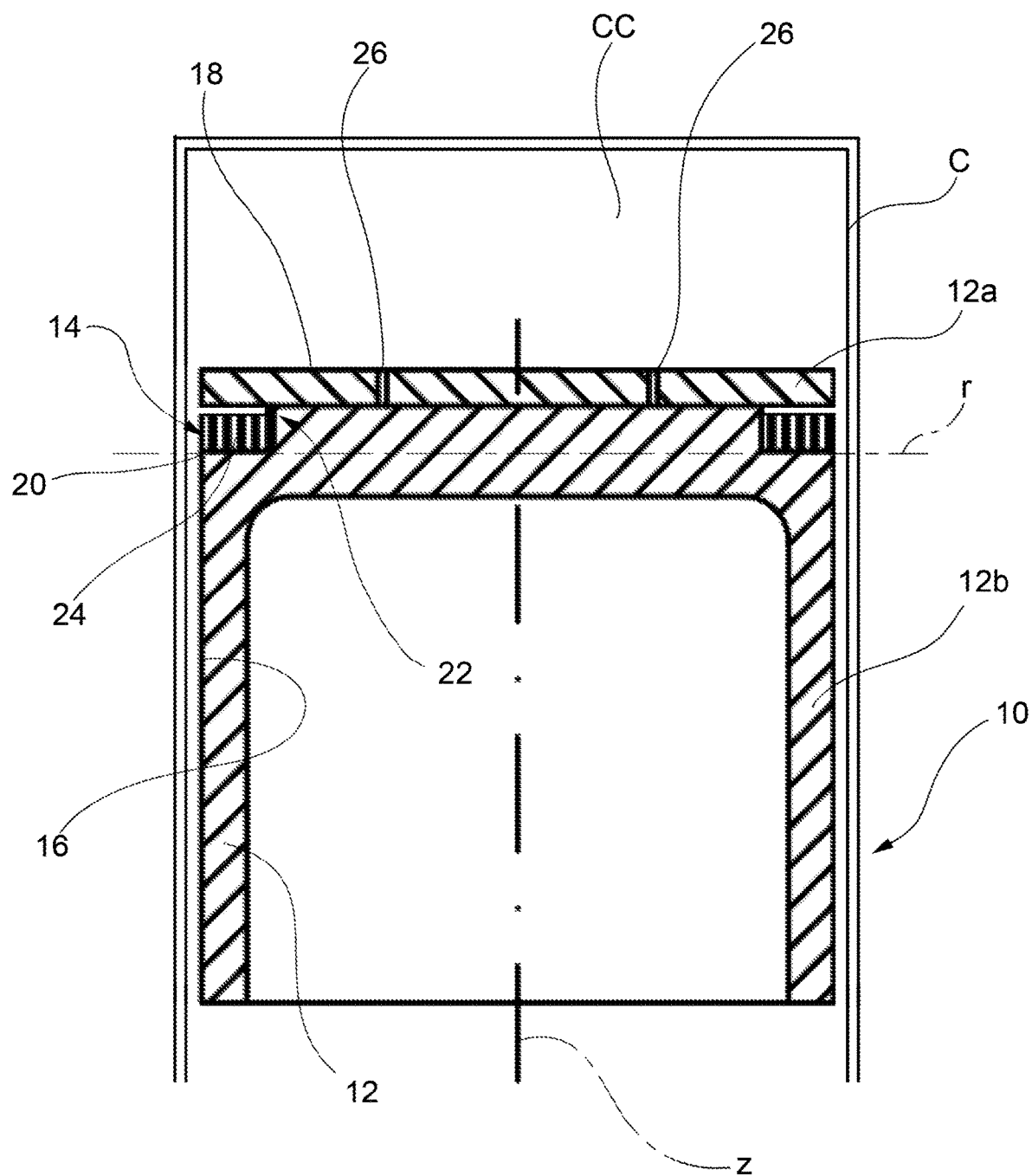
FIG. 3 is a cross section, along a radial plane, of a piston according to the invention.

Referring initially to FIG. 3, a piston for compressing a pneumatic fluid in a cylinder C according to the invention is generally indicated with 10.

The piston 10 essentially comprises a piston body 12 and a sealing assembly 14.

The piston body 12 is generally cylindrical in shape, and is arranged in use inside the cylinder C so as to be able to slide along an axial direction z for compressing a fluid in the cylinder C. The piston body 12 has a side wall 16, which in use faces an inner wall of the cylinder C, and a top wall 18, which in use defines, together with the cylinder C, a compression chamber CC.

Along the side wall 16 of the piston body 12, in particular along a circumferential perimeter 20 of the side wall 16, a seat 22 for accommodating the sealing assembly 14 is defined.

Furthermore, according to a preferable embodiment of the invention, the piston body 12 comprises two parts, in particular a first part 12a and a second part 12b. The first part 12a is comprised between the top wall 18 of the piston body 12 and the seat 22 thereof, while the second part 12b comprises the remaining part of the piston body 12. The first part 12a is preferably removable from the second part 12b, so as to facilitate the installation of the sealing assembly 14 within the seat 22.

With reference hereinafter also to FIG. 4a to 8, the sealing assembly 14 is housed in the seat 22 and is adapted to ensure the fluid-tightness of the compression chamber CC along said circumferential perimeter 20. The sealing assembly 14 comprises a plurality of sealing elements 24, which have shapes complementary to one another, and which are configured so that the wear of a particular sealing element 24 along said circumferential perimeter 20 caused by the reciprocating compression movement of the piston 10 corresponds to a sliding along a radially outer direction r of at least one adjacent sealing element 24.

By way of non-limiting example, the sealing elements 24 of the sealing group 14 are preferably made of a material based on carbon-filled polytetrafluoroethylene, or even more preferably boron nitride-filled, so as to be able to withstand the high temperatures to which they are subjected and, at the same time, ensure a low friction coefficient.

FIG. 4a to 8 are different embodiments of the sealing elements 24.

Figure 4B:
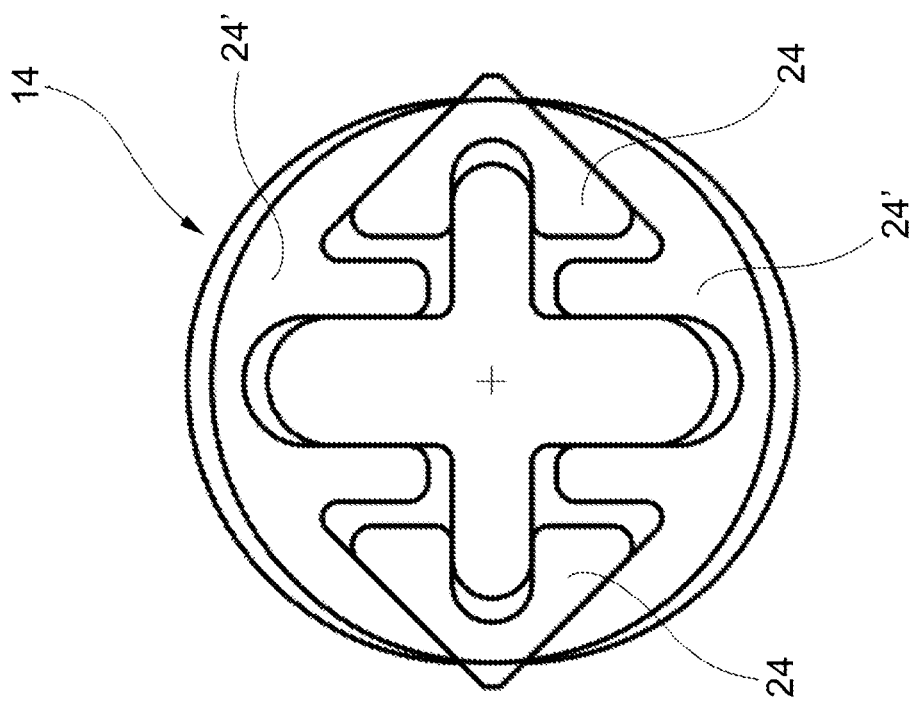
FIGS. 4a and 4b are cross sections along a transverse plane of a piston according to a first embodiment of the invention in a first and a second operating condition, respectively.
Figure 4A:
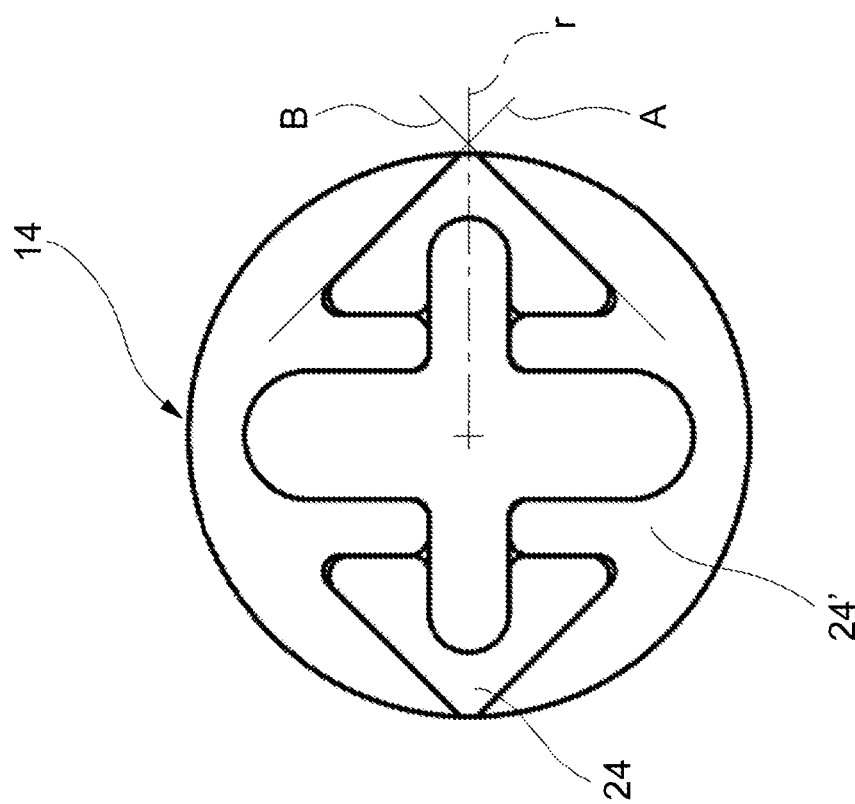

In a first embodiment, in FIGS. 4a and 4b, the sealing assembly 14 comprises four sealing elements, in particular a pair of first sealing elements 24 and a pair of second sealing elements 24'. Each first sealing element 24 has, at least at a radially outer portion, a substantially triangular planform. Conversely, each second sealing element 24' has, at least at a radially outer portion, a substantially circular sector planform. As is clearly visible in FIGS. 4a and 4b, in this first embodiment the first sealing elements 24 and the second sealing elements 24' are arranged in contact with one another in pairs, and slidable relative to one another along planes A and B, which are non-radial and non-parallel to one another and arranged converging in a radially outer direction. The plane A and the plane B are, in effect, perpendicular to the transverse plane shown in FIGS. 4a and 4b but not parallel to, nor coinciding with, a radial plane. In FIG. 4a the sealing assembly 14 is shown in a first operating condition, i.e., in an installation or initial condition. In FIG. 4b, on the other hand, the sealing assembly 14 is shown in a second operating condition, wherein the first sealing elements 24 and the second sealing elements 24' have moved in a radially outer direction, since the compressed air contained in the compression chamber CC may pass into the seat 22 and slip between the sealing elements 24 and 24' as a result of wear. In this way, as the sealing elements 24 and 24' wear out, they are pushed in a radially outer direction ensuring the seal along the circumferential perimeter 20. As is clearly seen in FIG. 4b, while the piston 10 slides inside the cylinder C, the radially outer portion of the sealing elements 24 and 24' jointly defines a continuous profile along said circumferential perimeter 20 in such a way as to maintain the fluid-tight seal of the compression chamber CC. In this first embodiment, the cross section of the piston body 12 along a transverse plane at the seat 22 has substantially a cross shape with beveled corners; obviously both the length and the thickness of the arms of this cross may be made in dimensions and proportions different from those shown in FIGS. 4a and 4b.

Figure 9:
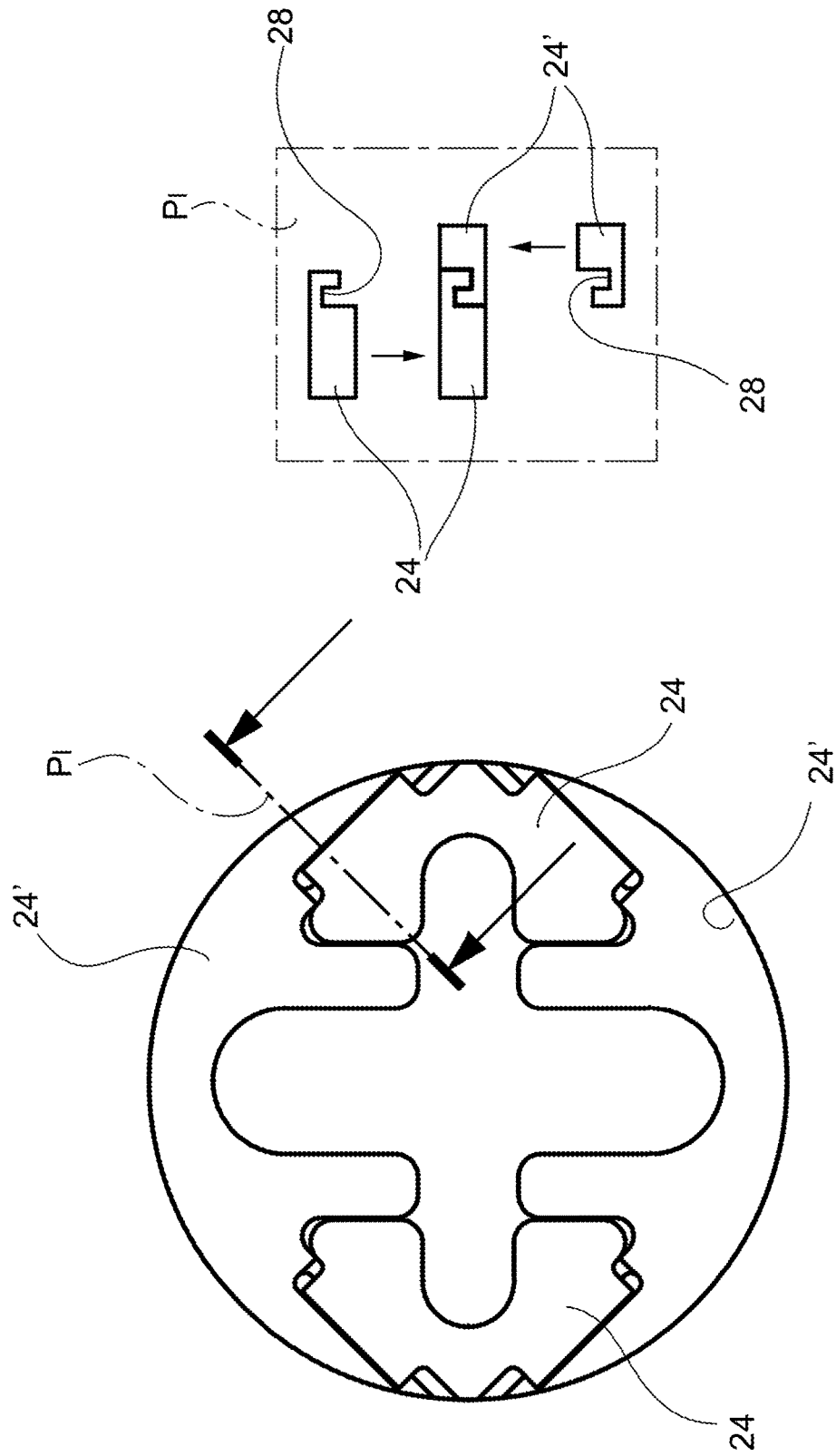

FIGS. 5a and 5b show a second embodiment of the invention, under operating conditions similar to those described with respect to FIGS. 4a and 4b, respectively. This second embodiment differs from the first embodiment described due to the presence of four through holes 26 on the top wall 18 of the piston body 12, adapted to put the compression chamber CC in fluid communication with the seat 22 to facilitate the passage of compressed air towards the radially inner area of the seat 22 and, therefore, pushing the first and second sealing elements 24 and 24' in a radially outer direction. Furthermore, in this second embodiment the first and second sealing elements 24 and 24' have sliding guides 28. The sliding guides 28 are arranged along respective contact surfaces 30 of the first and second sealing elements 24 and 24', and are configured so as to be coupled together and to allow the relative sliding of adjacent sealing elements. As shown in FIG. 9, the sliding guides 28 may be made by simple shape coupling; however, the sliding guides 28 may also be made in different configurations, or be replaced with other mechanisms adapted to facilitate the relative sliding of the adjacent sealing elements 24 and 24'. Also in this second embodiment, the cross section of the piston body 12 at the seat 22 along a transverse plane has substantially a cross shape, with beveled corners, according to that which has already been described with respect to the first embodiment.

Figure 6:
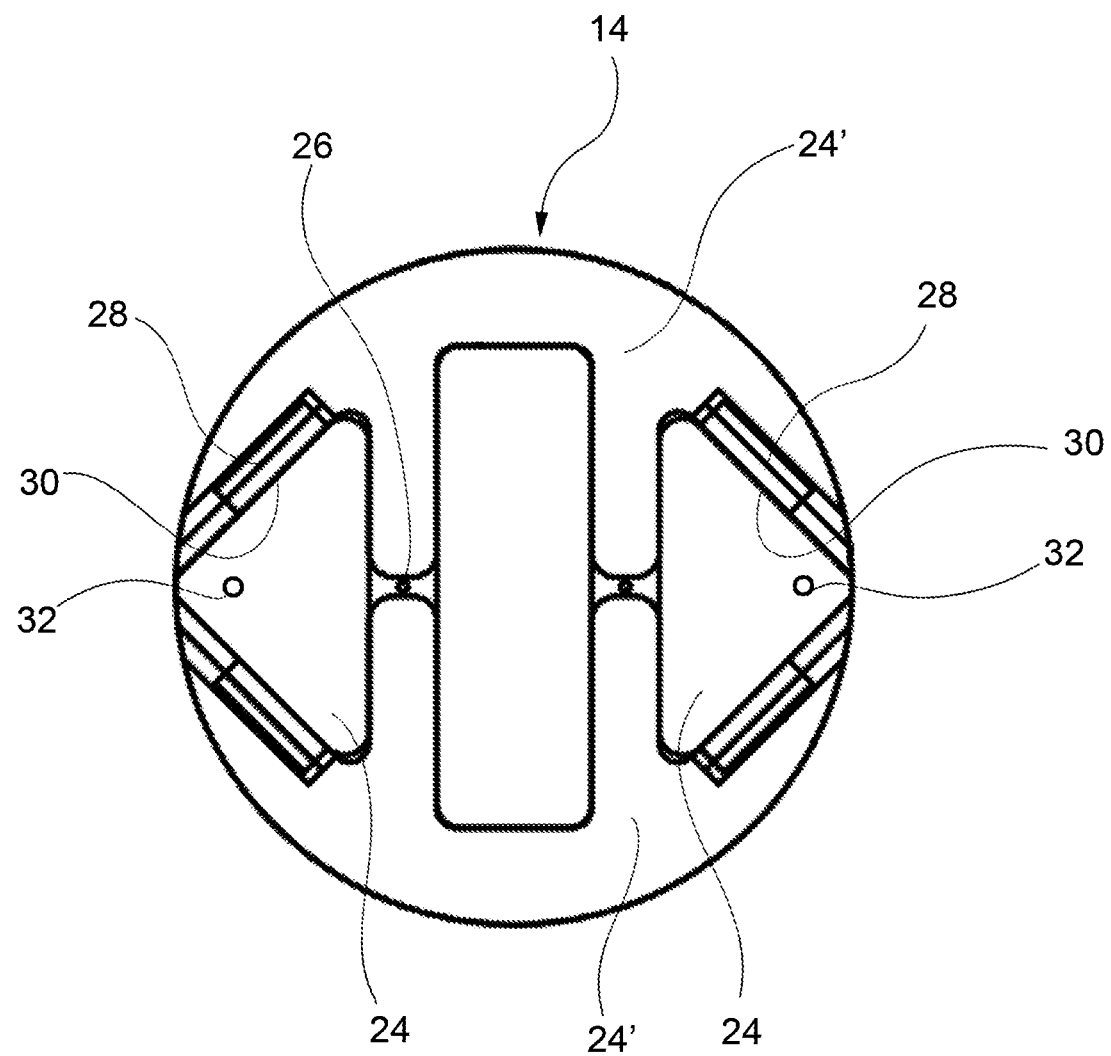
FIG. 6 is a cross section along a transverse plane of a piston according to a third embodiment of the invention.
Figure 7:
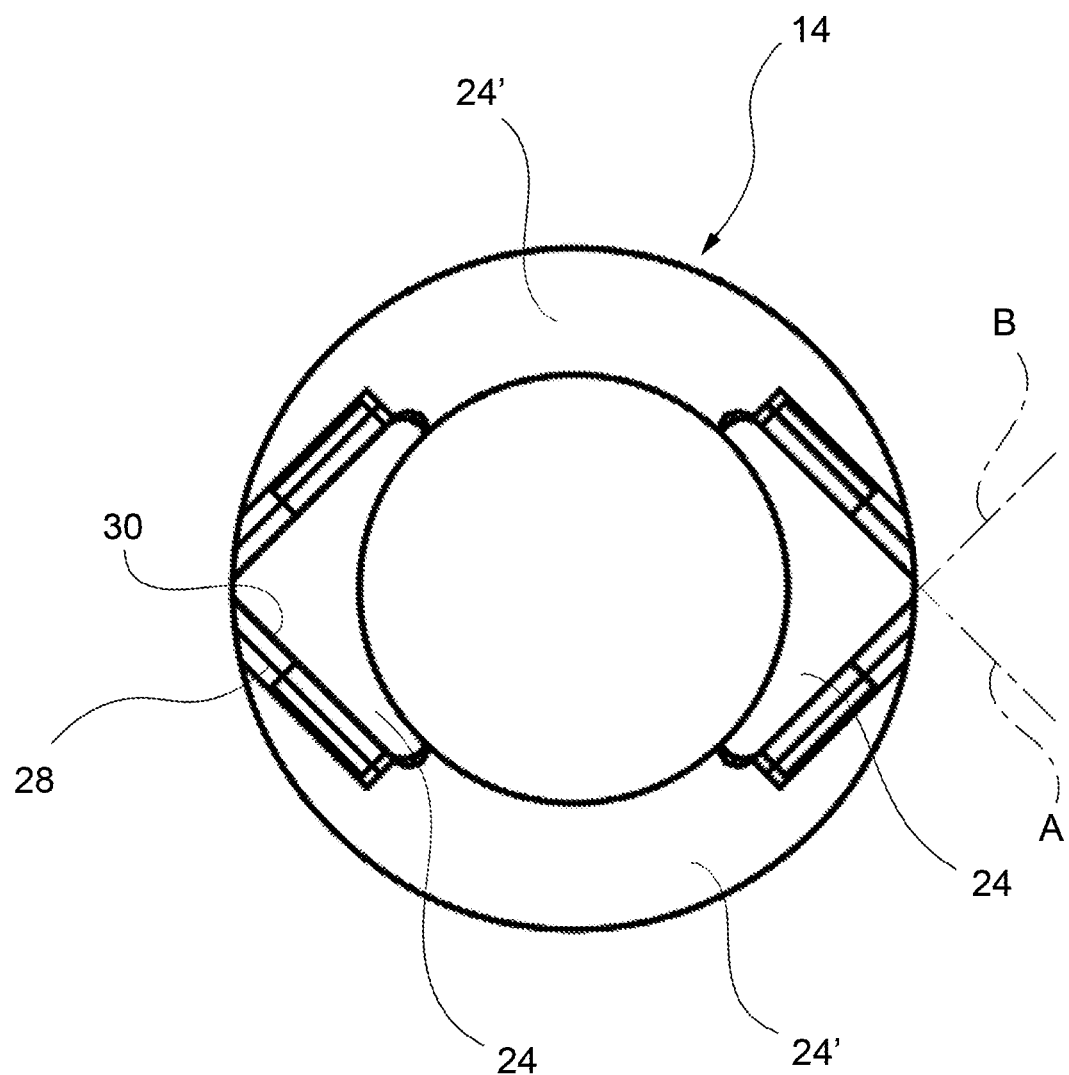
FIG. 7 is a cross section along a transverse plane of a piston according to a fourth embodiment of the invention.

FIGS. 6 and 7 show, respectively, a third and a fourth embodiment of the invention, which differ from the embodiments shown above only in the shape of the radially innermost portion of the sealing elements 24 and 24'. In effect, also in these embodiments, the first sealing elements 24 and the second sealing elements 24' are arranged in contact with one another in pairs, and slidable relative to one another along planes A and B, which are non-radial and non-parallel to one another and arranged converging in a radially outer direction. Moreover, also in these embodiments the adjacent sealing elements 24 and 24' are provided with sliding guides 28 adapted to facilitate the relative sliding. In the third embodiment, on the top wall 18 of the piston body 12, two through holes 26 are formed, adapted to put the compression chamber CC in fluid communication with the seat 22 to facilitate the passage of compressed air towards the radially inner area of the seat 22 and thus to push the first and second sealing elements 24 and 24' in a radially outer direction. In the fourth embodiment, however, these holes are absent. In the third embodiment, as seen in FIG. 6, the cross section of the piston body 12 at the seat 22 along a transverse plane has a substantially rectangular shape with beveled corners; obviously both the length and the thickness of the rectangular shape may be made in different dimensions and proportions than those shown in FIG. 6. In the fourth embodiment, however, as clearly visible in FIG. 7, the cross section of the piston body 12 at the seat 22 along a transverse plane has a substantially circular shape, and, consequently, the seat 22 is ring-shaped.

Figure 8:
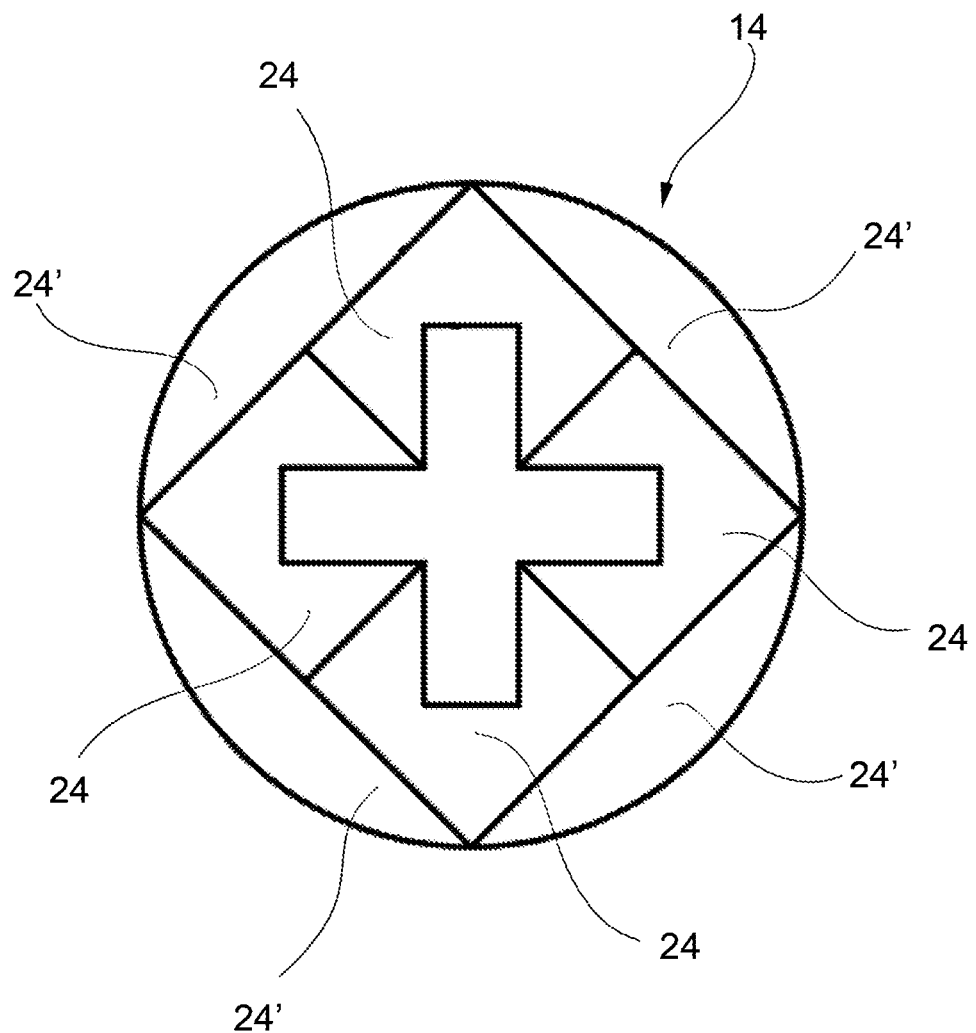
FIG. 8 is a cross section along a transverse plane of a piston according to a fifth embodiment of the invention.

FIG. 8 shows a fifth embodiment of the invention, which differs from the embodiments described above by the presence of a greater number of sealing elements. In particular, in the fifth embodiment the sealing assembly 14 comprises four first sealing elements 24 and four second sealing elements 24'. Each first sealing element 24 has, at least at a radially outer portion, a substantially triangular planform. Conversely, each second sealing element 24' has, at least at a radially outer portion, a substantially circular sector planform. In the fifth embodiment, as is clearly visible in FIG. 8, the cross section of the piston body 12 at the seat 22 along a transverse plane has substantially a cross shape, the corners of which may be beveled or not; obviously both the length and the thickness of the arms of this cross may be made in different dimensions and proportions than those shown in FIG. 8.

According to a preferable embodiment of the invention, at least one sealing element 24 of the sealing assembly 14 has a check hole 32 arranged so that, at a certain level of wear of this sealing element 24, the check hole 32 puts the compression chamber CC in fluid communication with the rest of the cylinder C, so that the fluid-tightness of the compression chamber CC along the circumferential perimeter 20 of the side wall 16 of the piston body 12 is no longer ensured. In this way, it is possible for an operator to easily recognize the moment in which the wear of said sealing element 24 has reached a predetermined level at which the replacement of the sealing element 24 is necessary: in effect, when the wear is such that the check hole 32 puts the compression chamber CC in fluid communication with the rest of the cylinder C, the loss of pressure in the compression chamber CC will be evident to the operator. The check hole 32 may be positioned at a specific radial distance as a function of the tolerable wear level for the sealing element 24.

The piston 10 according to the invention is particularly suitable for application in a reciprocating compressor, and in particular in a reciprocating compressor used in a railway vehicle. In a reciprocating compressor, maintaining the seal is necessary for correct operation, and the consequences of a deterioration of the seal vary from the simple reduction of the useful capacity of the compressor to seizure.

As is clear from the foregoing detailed description, the piston according to the invention has several advantages over the prior art.

First of all, due to the configuration of the sealing unit, the piston according to the invention may ensure a better sealing and a longer duration of use. In effect, due to the greater thickness of the sealing elements with respect to conventional sealing rings, and due to the complementary arrangement of the sealing elements of the sealing assembly, the sealing assembly offers a greater quantity of consumable material, and, consequently, a longer time interval between replacement or maintenance.

Moreover, due to the fact that the sealing elements are multiple and movable with one another, and particularly in the presence of at least one through hole on the top wall of the piston body to the seat, the seal of the sealing elements along the circumferential perimeter is improved by the fact that the pressurized air arriving from the compression chamber pushes the sealing elements in a radially outer direction in contact with the inner wall of the cylinder.

Furthermore, due to the particular shapes assumed by the seat, it is possible to define a specific angular orientation of the sealing elements and, consequently, to distribute the loads according to the project in order to reduce the wear rate with respect to the weaker sealing elements.

Lastly, in the presence of at least one check hole on at least one sealing element, the piston according to the invention allows the operator to determine easily and in time if the seal is still optimal or if the wear due to use requires maintenance.

Various aspects and embodiments of a piston according to the invention have been described. It is understood that each embodiment may be combined with any other embodiment. Naturally, the invention is not limited to the embodiments described purely by way of example, but may be varied within the scope defined by the appended claims.

The invention claimed is:

1. A piston for the compression of a pneumatic fluid in a compression chamber of a cylinder comprising:
   a cylindrically shaped piston body, adapted to be arranged slidably within said cylinder, and having a side wall and a top wall; along a circumferential perimeter of said side wall of the piston cylindrically shaped body a seat being defined; and
   a sealing assembly accommodated in said seat, and adapted to ensure the fluid-tightness along said circumferential perimeter;
   the sealing assembly comprising a plurality of sealing elements, having shapes complementary to one another, and configured so that the wear of a sealing element along said circumferential perimeter corresponds to a sliding in a radially outer direction of an adjacent sealing element, wherein said seat is shaped so that a cross section of the piston body at said seat along a transverse plane has a substantially cross shape or a substantially rectangular shape, with beveled corners.

2. The piston according to claim 1, wherein adjacent sealing elements are arranged slidable to each other along a non-radial plane.

3. The piston according to claim 2, wherein each sealing element is arranged slidable relative to respective adjacent sealing elements along planes converging in a radially outer direction.

4. The piston according to claim 1, wherein the sealing assembly comprises at least:
   a first sealing element having, at least at a radially outer portion, a substantially triangular planform; and
   a second sealing element, adjacent to the first sealing element, having, at least at a radially outer portion, a planform substantially shaped as an annulus circular sector.

5. The piston according to claim 4, wherein, in an operational condition wherein the piston slides within the cylinder, the radially outer portion of the sealing elements jointly defines a continuous profile along said circumferential perimeter in such a way to preserve the fluid-tightness.

6. The piston according to claim 1, further comprising at least one through hole provided through the top wall of the piston body to said seat, so as to cause said sliding of a sealing element in a radially outer direction.

7. The piston according to claim 6, wherein said at least one hole is arranged to put said compression chamber in fluid communication with said seat.

8. The piston according to claim 1, wherein adjacent sealing elements have, along respective contact surfaces, respective sliding guides configured to engage each other and to allow the relative sliding of the adjacent sealing elements.

9. The piston according to claim 1, wherein said piston body comprises two parts, a first part, comprised between said top wall of the piston body and said seat of the piston body, and a second part comprising the remaining part of the piston body, the first part being mounted detachably on the second part.

10. The piston according to claim 1, wherein the sealing elements of the sealing assembly are made of a boron nitride-filled polytetrafluoroethylene-based material.

11. A reciprocating compressor of a railway vehicle comprising the piston according to claim 9, and the cylinder, wherein the piston body is arranged slidably within said cylinder, and wherein the top wall of the piston body and the cylinder are arranged so as to jointly define the compression chamber.

12. A piston for the compression of a pneumatic fluid in a compression chamber of a cylinder comprising:
   a cylindrically shaped piston body, adapted to be arranged slidably within said cylinder, and having a side wall and a top wall; along a circumferential perimeter of said side wall of the piston cylindrically shaped body a seat being defined; and
   a sealing assembly accommodated in said seat, and adapted to ensure the fluid-tightness along said circumferential perimeter;
   the sealing assembly comprising a plurality of sealing elements, having shapes complementary to one another, and configured so that the wear of a sealing element along said circumferential perimeter corresponds to a sliding in a radially outer direction of an adjacent sealing element, wherein at least one sealing element has a through check hole, arranged in such a way that, at a certain level of wear of said sealing element, said check hole is arranged to make sure the fluid-tightness along the circumferential perimeter of the side wall of the piston body is no longer ensured.

13. The piston according to claim 12, wherein adjacent sealing elements are arranged slidable to each other along a non-radial plane and each sealing element is arranged slidable relative to respective adjacent sealing elements along planes converging in a radially outer direction.

14. The piston according to claim 12, wherein the sealing assembly comprises at least:
   a first sealing element having, at least at a radially outer portion, a substantially triangular planform; and
   a second sealing element, adjacent to the first sealing element, having, at least at a radially outer portion, a planform substantially shaped as an annulus circular sector, wherein, in an operational condition wherein the piston slides within the cylinder, the radially outer portion of the sealing elements jointly defines a continuous profile along said circumferential perimeter in such a way to preserve the fluid-tightness.

15. The piston according to claim 12, further comprising at least one through hole provided through the top wall of the piston body to said seat, so as to cause said sliding of a sealing element in a radially outer direction, wherein said at least one through hole is arranged to put said compression chamber in fluid communication with said seat.

16. The piston according to claim 12, wherein adjacent sealing elements have, along respective contact surfaces, respective sliding guides configured to engage each other and to allow the relative sliding of the adjacent sealing elements.

17. The piston according to claim 12, wherein said piston body comprises two parts, a first part, comprised between said top wall of the piston body and said seat of the piston body, and a second part comprising the remaining part of the piston body, the first part being mounted detachably on the second part.

18. The piston according to claim 12, wherein the plurality of sealing elements of the sealing assembly are made of a boron nitride-filled polytetrafluoroethylene-based material.

19. A reciprocating compressor of a railway vehicle comprising the piston according to claim 11, and the cylinder, wherein the piston body is arranged slidably within said cylinder, and wherein the top wall of the piston body and the cylinder are arranged so as to jointly define the compression chamber.

\* \* \* \* \*